March 22, 1960 T. R. GARRITY 2,929,670

APPARATUS FOR PRODUCING MAGNETIC RECORDS ON TAPE

Original Filed Oct. 22, 1952 3 Sheets-Sheet 1

INVENTOR
THOMAS R. GARRITY
BY [signature]
ATTORNEY

March 22, 1960 T. R. GARRITY 2,929,670

APPARATUS FOR PRODUCING MAGNETIC RECORDS ON TAPE

Original Filed Oct. 22, 1952 3 Sheets-Sheet 2

INVENTOR
THOMAS R. GARRITY

BY [signature]

ATTORNEY

INVENTOR
THOMAS R. GARRITY
BY [signature]
ATTORNEY

United States Patent Office 2,929,670
Patented Mar. 22, 1960

2,929,670

APPARATUS FOR PRODUCING MAGNETIC RECORDS ON TAPE

Thomas R. Garrity, Wappingers Falls, N.Y., assignor to International Business Machines Corporation, New York, N.Y., a corporation of New York Original application October 22, 1952, Serial No. 316,247. Divided and this application November 12, 1958, Serial No. 773,420

7 Claims. (Cl. 346—74)

This invention relates to means for making magnetic control records for record controlled machines, this application being a division of my application for United States patent, Serial No. 316,247, filed October 22, 1952 for Magnetic Tape and Method for Producing Record Thereon, now abandonded.

It is an object of the invention to provide means for producing a control record having magnetic spots capable of producing distinctly different responses in a sensing device, depending upon the novel arrangement and differentiating characteristics of the spots.

It is a further object of the invention to provide means for producing a magnetic record of great information densities.

These and other objects of the invention are attained by providing a magnetic recording head having a plurality of recording gaps which are disposed in angular relation to each other such that record spots can be produced in diagonal relation to an axis of the record body. It is also a purpose of this invention to provide a recording head of the kind herein disclosed which can also be utilized to produce a record having crossed spots, the magnetic axes of which are angularly arranged in relation to each other.

The invention further contemplates a control system for a recording head capable of producing bipolar magnetic spots on a record body, such as that indicated, whereby the magnetic spots are further differentiated.

In pulse or magnetic spot recording on magnetic record bodies, there are definite restrictions which limit the information density. In any given magnetic recording system, the information density is a function of the number of spots per unit length of the record body, and the number of tracks, or magnetized strips on such body. The restrictions as to the number of spots per unit length of a record body are imposed because of the fact that, as the density of the spots is increased beyond a certain point, such spots begin to demagnetize each other. Therefore, a definite spacing between spots within a track must be maintained. As magneto motive force used in applying the spots to the record body is increased, the spacing between adjacent spots must be increased correspondingly to avoid the demagnetizing effect. On the other hand, spacing between strips or tracks of spots made on a single record body must likewise be maintained for the same reason, e.g., because the spots when applied to a magnetic record body set up a flux pattern which spreads not only longitudinally along a record body, i.e., between successive spots, but the flux also spreads out laterally across the record body. Therefore, a spacing between adjacent tracks or strips of spots on a single record body must be maintained in order to avoid interference between spots of adjacent tracks. Such interference is not only that of demagnetization, but also the fact that when the record body is being read, if insufficient spacing is maintained, the magnetic spots on one track cause interference during the reading of an adjacent track of the record body.

Accordingly, it is a specific object of the invention to provide a magnetic recording head which will record magnetic spots such that interference between adjacent tracks of magnetic spots on a record body is avoided. This is accomplished by utilizing a multi-gap recording head in which the gaps are disposed in angular relation to each other such that when recording, the spots of one track are disposed diagonally to an axis of the record body while the spots of an adjacent track are disposed on the opposite diagonal.

Another specific object of the invention is to provide means for superimposing diagonally applied magnetic spots upon the same strip or track of a record body, one group of spots being applied with their axes lying along one diagonal and the other group being applied with their axes lying along the opposite diagonal.

A further specific object of the invention is to provide a multi-characteristic spot recorder and to teach a method and means of using multi-characteristic spots produced thereby in magnetic recording.

One manner in which these and other objects may be attained will appear from the detailed description in which the record body on which the recording head is shown to operate will be referred to as a tape.

As set forth in the stated objects, one of the methods of this invention results in doubling the information density on a tape, i.e., the number of magnetized spots per unit length of tape, by means of orienting the magnetic axis of each spot at an angle of about 45° with the longitudinal axis of the tape. One type of magnetized spot here contemplated is a bipolar spot in a strip of permanently magnetizable material. Such a magnetic spot will have an axis which runs through the north and south poles of the permanently magnetized spot, and will have a polarity characteristic depending upon the relative location of the north and south poles with respect to one another. The magnetic axis of the spot will be at right angles to the gap in the head which formed the spot, because the lines of force of the magnetic field which form the spot take the shortest path, viz. at right angles to the gap. Each magnetic spot as formed in a tape has directional as well as polarity characteristics, the lines of force largely lying in parallel relation in a direct path between the north and south poles. Hence, the axis of a spot will be the center line joining the centers of the north and the south pole areas. The polarity characteristic of these magnetic spots depends upon the location of the magnetic poles as mentioned above, because the direction of flow of electric current in a pick-up head is dependent upon the familiar rules of electromagnetic induction, and therefore the current induced in the pick-up head will be reversible in characteristic. The use of bipolar magnetic spots in magnetic tape recording is described in United States patent to Robert I. Roth, No. 2,436,829, issued March 2, 1948.

Figure 2:
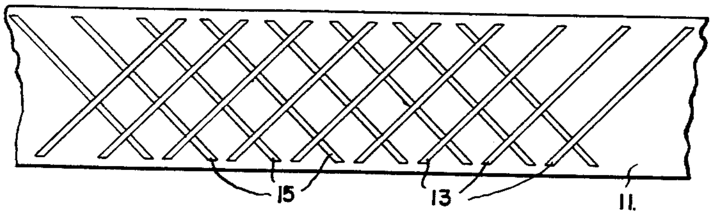
Fig. 2 is a schematic illustration of a magnetic tape showing the orientation of lines of flux when two sets of magnetic spots are superimposed.

As illustrated in Fig. 2 of the drawings forming a part of this application, a strip of tape 11 may have one set of magnetized spots applied with their magnetic axes lying at a diagonal, or about 45° to the longitudinal axis of strip 11. This orientation is schematically illustrated by means of slanted bars 13. Since, when the tape is being read, the pick-up head is substantially insensitive to lines of flux which are parallel to the gap of the pick-up head, only those lines of flux lying at right angles to the gap will affect the pick-up head and produce a signal. Therefore, if the strip of tape 11 is magnetized with a series of spots having their magnetic axes slanted, as illustrated by bars 13, a second series of spots having their magnetic axes slanted on the opposite diagonal or at about 45° in the other direction with respect to the longitudinal axis of strip 11 (as illustrated by slanted bars 15) may be superimposed on the same area of tape 11. Therefore, double the number of spots may be applied for a unit length of tape 11 and in reading either series of spots, the interferences from the other series will be negligible because the lines of flux are oriented at right angles to one another and only the desired series of spots will affect a reading head placed at a given diagonal. Although there will be areas where the lines of flux having a high density will cross one another as is illustrated by the schematic bars 13 and 15, and these areas will be magnetically saturated, the areas between the saturated points, however, will be able to supply the necessary lines of force to produce a signal.

Figure 3:
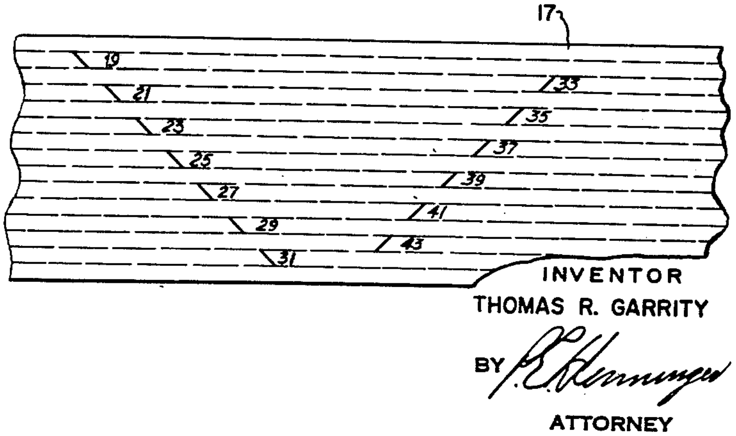
Fig. 3 illustrates a fragment of a magnetic tape containing a number of tracks or strips and illustrates the increase in number of tracks which may be attained by this invention.

Another method by which the information density may be at least doubled, is that illustrated by Fig. 3 where a strip of magnetic tape 17 has applied thereon a number of tracks. Using the principles of this invention, every alternate track 19, 21, 23, 25, 27, 29 and 31 may be magnetized with spots having their magnetic axes lying diagonally to the edge or longitudinal axis of tape 17. Tracks 33, 35, 37, 39, 41 and 43, lying between the aforesaid alternate tracks, may be magnetized with spots having their magnetic axes lying along the opposite diagonal or at about 90° to the axes of the spots on the tracks 19, 21, etc.

It may be pointed out that the increase in the number of tracks on tape 17, according to this later method, is possible because no interference is developed between adjacent tracks, the lines of flux having been set up at right angles to one another in such adjacent tracks. The slant lines shown lying in each of the tracks 19 through 43 illustrate the orientation of the magnetic axes of the spots which are applied along each track.

It will be appreciated that any appropriate type of magnetic spot-forming writing head may be used to apply the spots to the magnetic tape in the methods as described with reference to Figs. 2 and 3, one such writing head being described and shown in the aforementioned patent to Robert I. Roth.

An important feature of the invention lies in the orientation of the magnetic spot-producing head with its gap lying at a diagonal or approximately 45° in one direction or the other in relation to the longitudinal axis of the magnetic tape. It will be appreciated that with respect to the superimposed spot method illustrated by Fig. 2, it would not be necessary to have the axes of the spots lie diagonally with respect to the tape so long as the axes of each series of spots are placed at right angles to the axes of the other series upon which the second series is superimposed.

With respect to the method of increasing the number of tracks as illustrated in Fig. 3, the illustrated diagonal orientation of the spots in relation to the tape need not necessarily be maintained so long as the spots of adjacent tacks are oriented at right angles to each other. However, the most efficient use of the available area on the tape becomes possible by using the diagonal orientation of the spots with reference to the axes of the tape since closer spacing of the successive spots in each track is possible with this arrangement.

Figure 1:
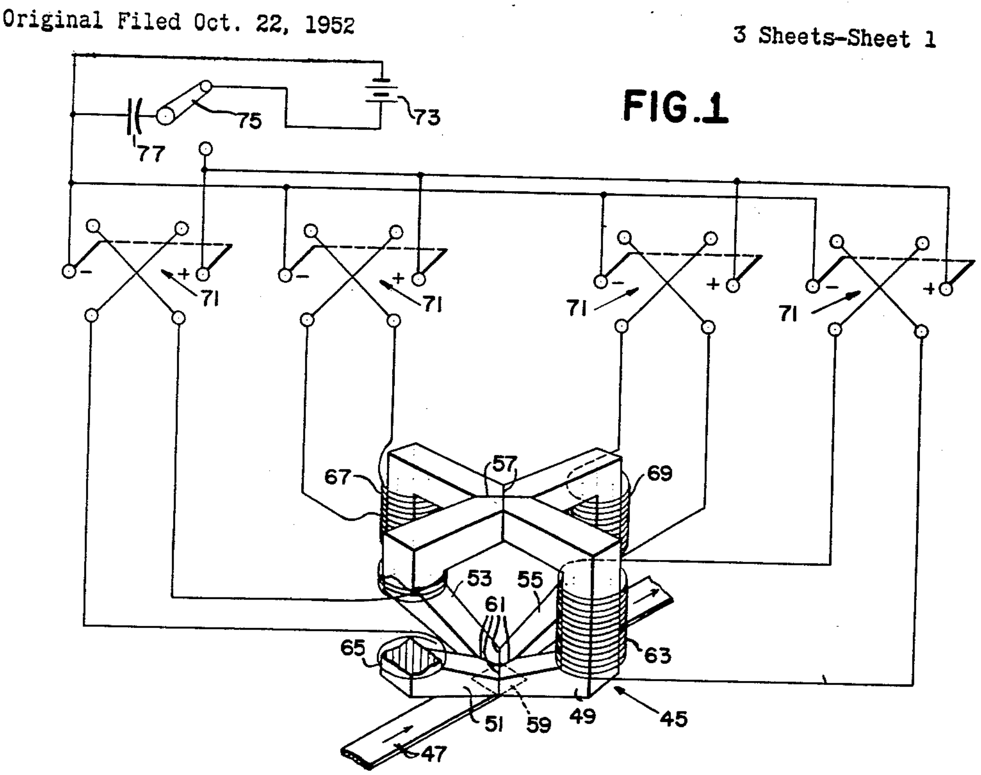
Fig. 1 is a perspective view of a combined spot recording head showing the electrical circuit for its coils.

In Fig. 1 there is illustrated a combined multiple characteristic spot-producing head 45 shown in juxtaposition with a strip of tape 47. The multiple spot-producing head 45 may be constructed with four separate magnetic paths made up of a group of magnetic material legs 49, 51, 53 and 55. These legs are joined at the top in intimate contact. Their intersection forms an X shaped pattern 57 although any desirable intimate contact pattern may be employed.

A the bottom of the multiple spot head 45, the legs 49, 51, 53 and 55 are joined to form a square or rectangular face 59 which has a set of gaps 61 in the shape of an X. The gaps 61 are preferably formed by a thin copper shim disposed between the adjacent faces of the intersection of legs 49, 51, 53 and 55.

The formation of a magnetic spot will be accomplished in a well-known manner by the energization of a group of coils 63, 65, 67 and 69. Energization of these coils may be accomplished with any appropriate source of direct current, and is effected with reversible polarity, e.g. by means of reversing switches 71. In producing this type of magnetic spot, a very satisfactory means of energization of coils 63, 65, 67 and 69 for a short duration and with a rather high current flow, may be such as that illustrated by use of a battery 73 and a single pole double-throw switch 75 in connection with a condenser 77. The condenser 77 will be charged by throwing the switch 75 to the position shown in Fig. 1 and then, after setting the reversing switches 71 in a desired combination of positions, switch 75 will be thrown to the opposite position, where it will open the circuit of battery 73 and connect the charged condenser 77 to the parallel circuits for coils 63, 65, 67 and 69, via the reversing switches 71. This will allow the condenser to discharge through the four coils simultaneously, energizing the coils and producing a magneto-motive force in each of the four legs 49, 51, 53 and 55 which will, in turn, magnetize the spot on tape 47 which is then adjacent to the face area 59 of the four magnetic material legs 49 through 55.

It will be noted that the reversing switches 71 may be closed in a variety of combinational patterns, and because of the vector or directional properties of a magnetic spot as produced by this type of magnetic writing head, a multiple characteristic magnetic spot may be thereby produced on the tape.

Figure 4:
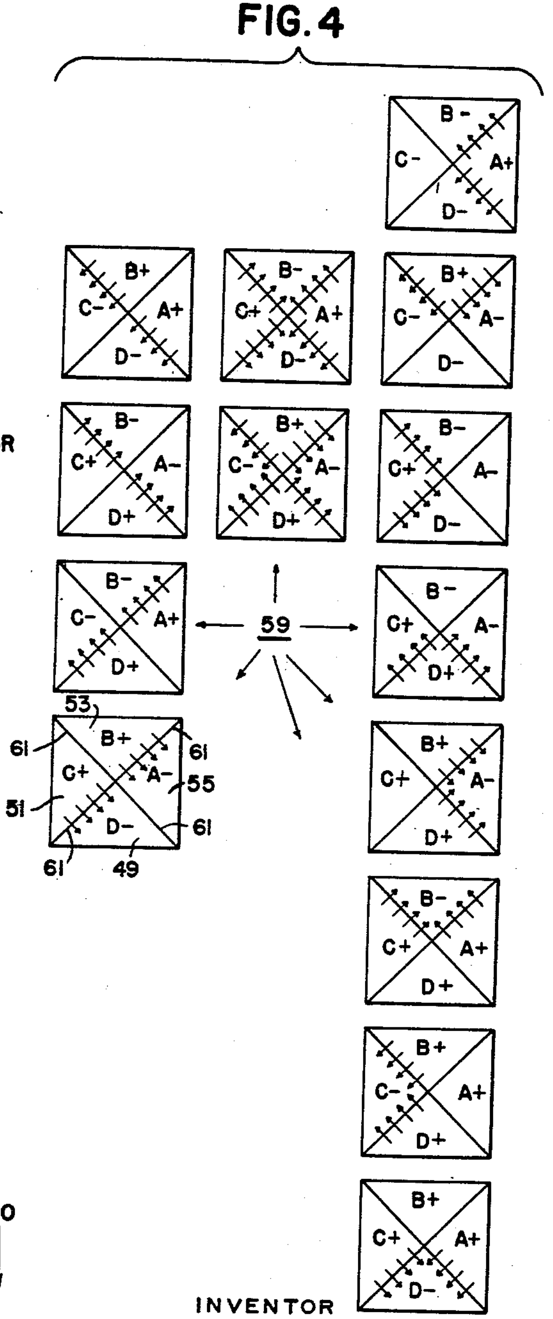
Fig. 4 illustrates a series of enlarged views of the face of a multiple characteristic spot read-write head showing the various combinations of multiple characteristic spots which may be obtained by use of the multiple characteristic spot recorder.

The variously differentiated spots which may be produced by means of the multiple spot head 45 are illustrated in Fig. 4. In Fig. 4 each square represents the face 59 of the magnetic spot head 45 and the small arrows within the squares illustrate the direction of the flux which is produced by the energization of the coils 63 through 69 in one direction or the other as determined by the combinational setting of reversing switches 71 prior to the discharging of condenser 77 by throwing switch 75 to its discharge position. Polarities of the magnetic flux paths of the four legs 49, 51, 53 and 55 are indicated by plus (+) and minus (−) signs. Plus may be assumed to represent a north pole. It will be observed that whenever adjacent legs of the head 45 have the same polarity, no flux tends to flow between such legs. In the case where three of the legs have the same polarity, it will be observed that all of the flux is illustrated as passing from the fourth leg having opposite polarity to or from its adjacent two legs only. The reason for this will be apparent upon investigation of the electrical analogy. However, it will be sufficient to point out that the amount of flux which tends to flow to the non-adjacent leg is only about 5% of that flowing to adjacent legs.

It will be observed that it is possible to produce spots having fourteen (14) different characteristics with a single spot-producing head 45. It will be appreciated that by using the spot-producing head 45 as a pick-up or reading device, a different characteristic signal for each of the fourteen characteristic spots on a tape being read, may be produced. For example, volt meters might be connected across each of the four coils 63, 65, 67 and 69. Then when the tape 47 with spots already impressed thereon is moved rapidly across the face 59 of multiple head 45, a given combination of voltages of one polarity or the other would be induced in the coils 63–69 and hence would register correspondingly on the volt meters.

Figure 5:
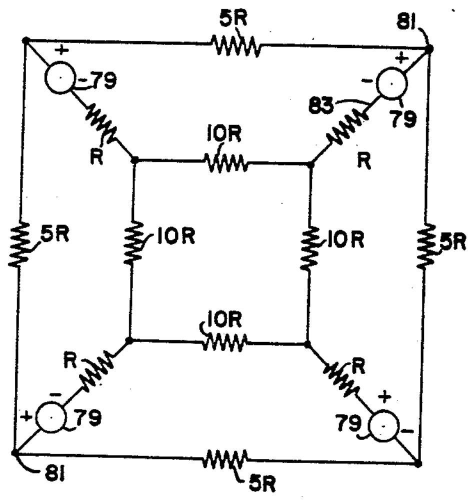
Fig. 5 is an electric bridge circuit which is analogous to the magnetic circuit of the multi-characteristic spot head.
Figure 6:
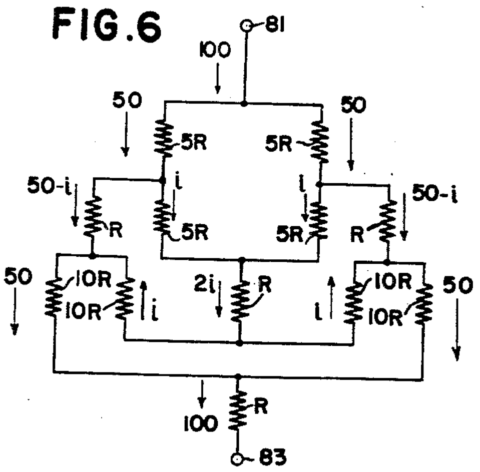
Fig. 6 is an electric circuit showing the path of current flow for purposes of calculation; and Figs. *7a–7d* show four bridge circuits which are to be superimposed to determine conditions of current flow.
Figure 7A:
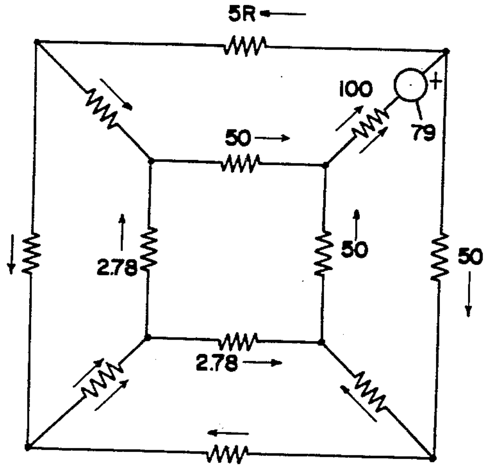
Figure 7C:
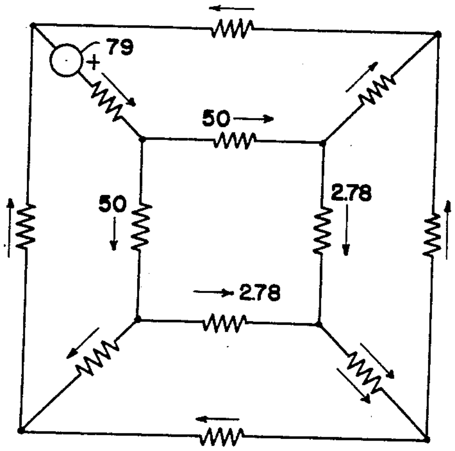
Figure 7B:
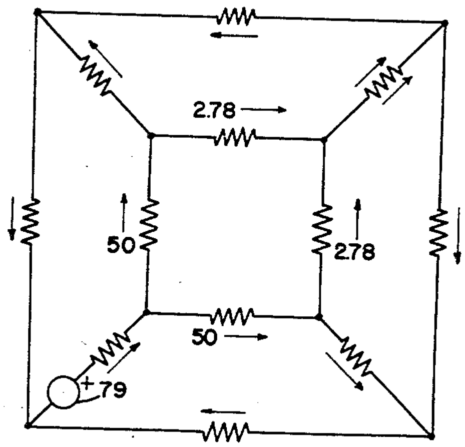
Figure 7D:
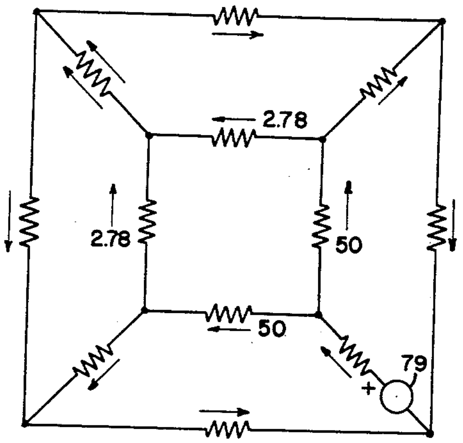

Fig. 5 illustrates an electric bridge circuit which is analogous to the magnetic circuit of multiple spot head 45. In order to show the flux distribution at the four gaps between legs 49 to 55, we will assume that the magneto-motive force applied by the coils 63 through 69 is the counterpart of voltage sources 79 illustrated in Fig. 5. Assuming that the resistances illustrated in Fig. 5 are the counterpart of the reluctances involved in the multiple spot head 45, and assuming the reluctance of each gap 61 is ten times greater than the reluctance of each magnetic material leg, e.g. 49, and also assuming that the reluctance of the points of intimate contact 57 is five times that of each magnetic material leg (e.g. 49), we may assign a resistance value of "R" to the diagonal resistors illustrated in Fig. 5. The resistors on the outside of the square illustrated in Fig. 5 will be the counterpart of the intimate contact areas 57 and will therefore be 5R as shown in Fig. 5. The resistors on the inner square represent the reluctance of the gaps 61 and are therefore given a value of 10R as illustrated. In order to calculate the current distribution through the 10R resistors, we may assume that three of the voltages 79 are short circuited and that the remaining voltage has a magnitude such that 100 amperes will flow through the adjacent diagonal resistor R. Then by laying out the current path from a corner point 81 to a point 83 (assuming current flow from plus to minus and assuming corner point 81 to be on the plus side of voltage 79) in a parallel path circuit diagram as illustrated by Fig. 6, the calculation of current flow in the individual legs will be as follows: by inspection, the current distribution may be found to be that illustrated in Fig. 6, i.e., starting with 100 amperes, dividing to 50 amperes in each branch, then each branch shunting off an unknown current flow "$i$" which rejoins its branch to make the branch current of 50 amperes again and finally the branches join to flow through the single diagonal resistor R at 100 amperes. The arrows indicate the direction of current flow. Now, by equating the IR voltage drops to the driving voltage E (source 79) we get the following equations:

$$(1)\quad 250R+5Ri+2Ri+10Ri+500R+100R=E$$

$$(2)\quad 250R+50R-Ri+500R+100R=E$$

reducing Equations 1 and 2 gives:

$$(1)\quad 850R+17Ri=E$$

$$(2)\quad 900R-Ri=E$$

subtracting Equation 2 from Equation 1 and solving for $i$, gives:

$$-50\,R+18\,Ri=0$$

$$18\,Ri=50\,R$$

$$18\quad i=50$$

$$i=\frac{50}{18}=\frac{25}{9}=2.78 \text{ amperes}$$

Now, by inserting the value of "$i$" in Fig. 6, the various currents may be found. Then by superimposing the currents caused by the four voltages 79, depending upon their polarities, the currents in the 10R resistors may be found. The analogous flux distribution will thus be determined. For example, taking the case when one of the reversing switches 71 is set for one direction of current flow and the other three switches 71 are set for the opposite direction, then the analogous current flow may be found be superimposing the four bridge circuits illustrated in Fig. 7 which gives currents of 100 amperes in the two adjacent 10R legs (analogous to gaps 61) and currents of 5.56 amperes in each of the other two 10R legs. It will be noted that the current distribution is such that the opposite leg (the one which has an opposite polarity compared to the other three) carries about 5% of the current flowing in each of the adjacent legs. This then bears out the statement concerning flux distribution which was made previously.

It will be observed that the current flow which is effected through the four resistors 10R is distributed so as to produce relative values which are the same as the relative strength of the flux produced across the four gaps 61 by the multiple head 45.

From the above description it will be apparent that by using a multiple spot head such as that disclosed in accordance with this invention a multiple characteristic magnetic spot may be produced, the character of which in the case of a head having four legs such as that illustrated in Fig. 1 will produce spots having fourteen distinct characteristics. These fourteen different characteristic spots are illustrated in Fig. 4, where the + symbols stand for a north magnetic pole and — signs stand for a south magnetic pole and assuming flux flow from north to south. In former practice a magnetic spot could have but two characteristics depending upon its polarity.

While I have disclosed specific embodiments of my invention which are preferred, it is clear that similar embodiments might be had which are within the scope of the ordinary skill of a journeyman in the art. Therefore, my disclosure should not be taken in a limiting sense but merely as descriptive.

I claim:

1. In a magnetic recording head adapted to recording of the spot characteristic type, means providing at least three magentic material paths, each said paths having an electromagnetic coil for producing magnetic flux therein, circuit means for energizing said coils with a given direction of current flow, and linear transducing gaps in said magnetic paths which intersect at a common point, said gaps being diagonally situated with respect to each other.

2. In a magnetic recording head adapted to recording of the spot characteristic type, means providing four legs of magnetic material, each having a coil wound thereon, circuit means for energizing said coils to produce magnetic flux in said legs, said legs meeting at a common area to form four transducing gaps adjacent to the path of a record body, said gaps all meeting at a common point and being situated diagonally with respect to each other.

3. In a magnetic recording head adapted to recording of the spot characteristic type, means providing four legs of magnetic material, each having a coil wound thereon, circuit means for energizing said coils simultaneously to produce a magnetized spot on a record body, said legs all meeting in intimate contact at a common point to complete a magnetic path for each leg, said legs meeting at a face area to form transducing gaps for location close to a record body, said gaps all being straight line in character and intersecting as an X at a common point, said gaps being situated diagonally with respect to an axis of the record body path.

4. A multi-characteristic multipolar spot read-write head comprising means providing at least three magnetic material paths, each said paths having an electromagnetic coil for producing magnetic flux therein, said magnetic paths having transducing gaps which intersect at a common point, and means for selectively energizing said coils with a given direction of current.

5. A multi-characteristic multipolar spot read-write head comprising means providing at least three magnetic material paths, each said paths having an electromagnetic coil for producing magnetic flux therein, circuit means for selectively energizing said coils with a given direction of current flow, and linear transducing gaps in said magnetic paths which intersect at a common point, said gaps being diagonally situated with respect to each other.

6. A multi-characteristic multipolar spot read-write head comprising means providing four legs of magnetic material, each having a coil wound thereon, circuit means for reversibly energizing said coils in a selected combination of directions, said legs meeting at a common area to form four transducing gaps adjacent to the path of a record body, said gaps all meeting at a common point and being situated diagonally with respect to each other.

7. A multi-characteristic multipolar spot read-write head comprising four legs of magnetic material, each said legs having a coil wound thereon, circuit means for reversibly energizing said coils simultaneously in a selected combination of directions to produce a corresponding selected polarity effect on the spot being recorded, said legs all meeting in intimate contact at a common point to complete a magnetic path for each leg, said legs meeting at a face area to form gaps transducing for location close to a recording station to magnetize a spot on a record body in such station; said gaps all being straight line in character and intersecting as an X at a common point, said gaps being situated diagonally with respect to an axis of the record body path.

References Cited in the file of this patent

UNITED STATES PATENTS

| | | |
|---|---|---|
| 2,548,109 | Howey | Apr. 10, 1951 |
| 2,673,248 | Hamberg | Mar. 23, 1954 |
| 2,700,073 | Kleis | Jan. 18, 1955 |
| 2,803,708 | Camras | Aug. 20, 1957 |

UNITED STATES PATENT OFFICE

CERTIFICATE OF CORRECTION

Patent No. 2,929,670 March 22, 1960

Thomas R. Garrity

It is hereby certified that error appears in the printed specification of the above numbered patent requiring correction and that the said Letters Patent should read as corrected below.

Column 4, line 1, for "tacks" read -- tracks --; line 16, for "A the" read -- At the --; column 8, line 4, for "gaps transducing" read -- transducing gaps --.

Signed and sealed this 20th day of September 1960.

(SEAL)
Attest:
KARL H. AXLINE
Attesting Officer

ROBERT C. WATSON
Commissioner of Patents